June 4, 1946.  J. MIHALYI ET AL  2,401,709
RANGE FINDER
Filed Jan. 19, 1943  4 Sheets-Sheet 1

JOSEPH MIHALYI
FORDYCE E. TUTTLE
INVENTORS

BY
ATT'Y & AG'T

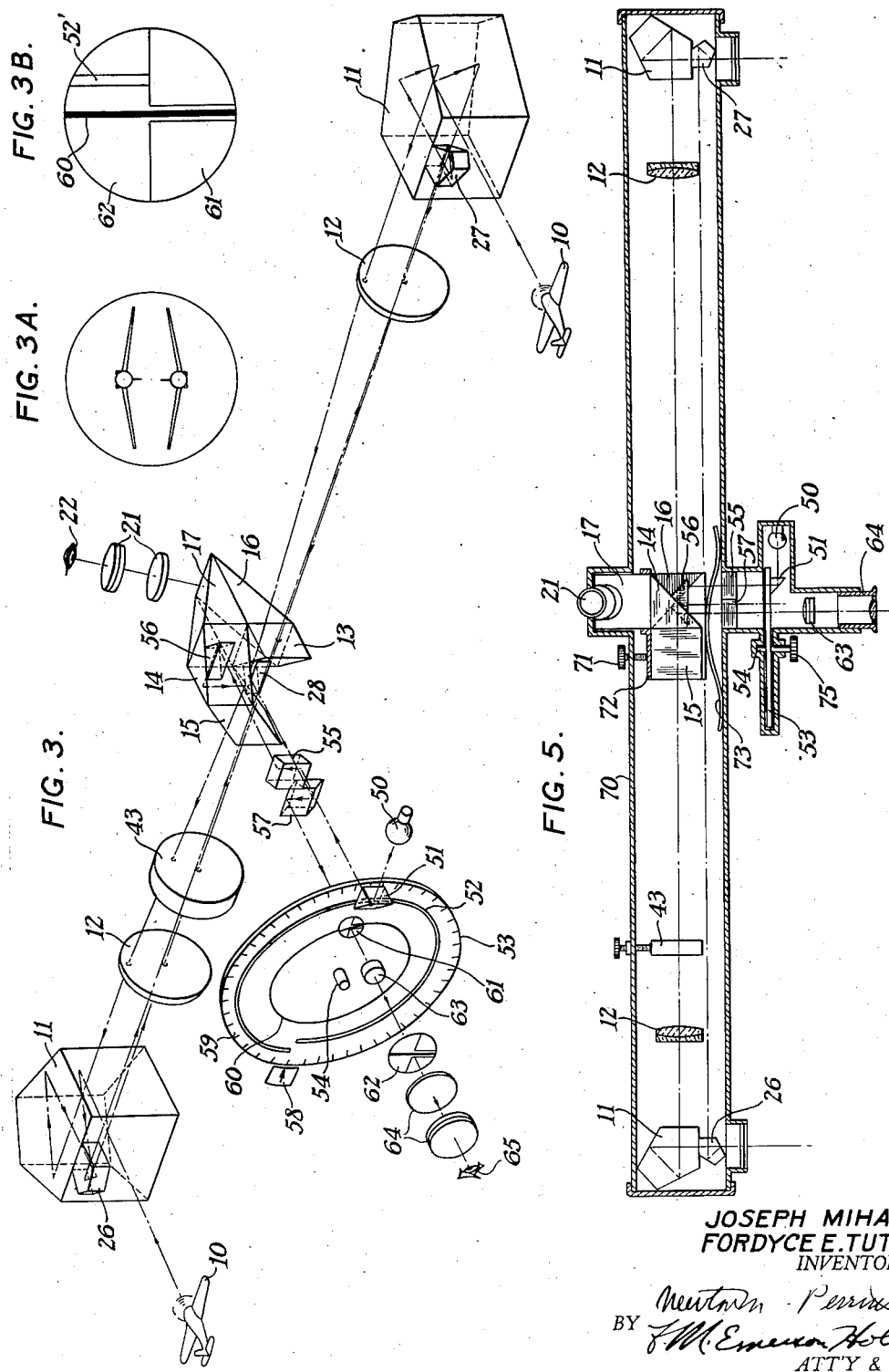

June 4, 1946.   J. MIHALYI ET AL   2,401,709
RANGE FINDER
Filed Jan. 19, 1943   4 Sheets-Sheet 3
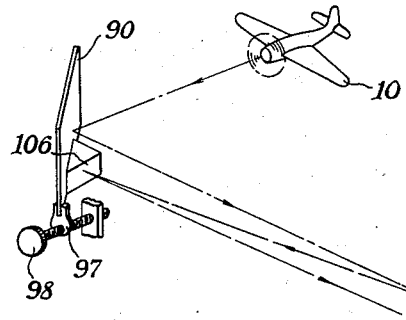
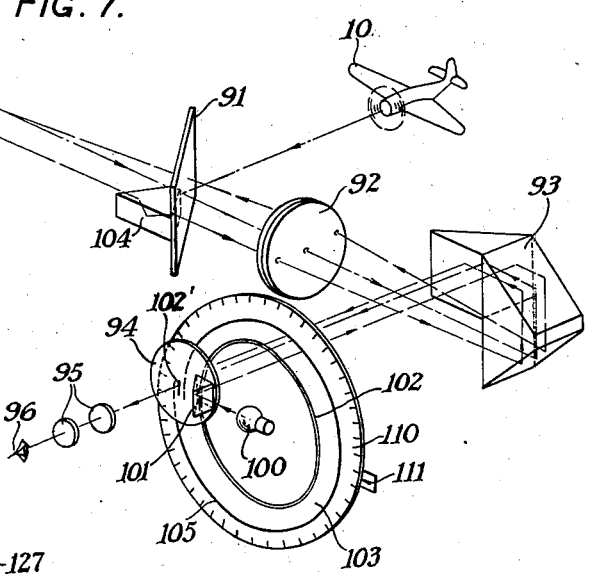
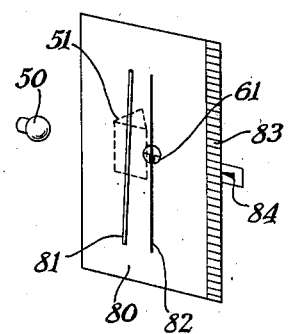
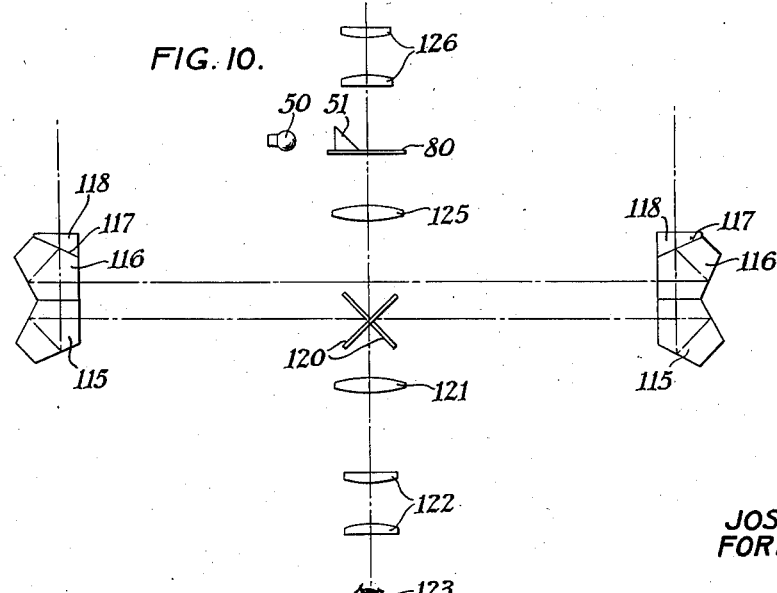
JOSEPH MIHALYI
FORDYCE E. TUTTLE
INVENTORS
BY
ATT'Y & AG'T June 4, 1946.　　　　J. MIHALYI ET AL　　　　2,401,709
RANGE FINDER
Filed Jan. 19, 1943　　　　4 Sheets-Sheet 4
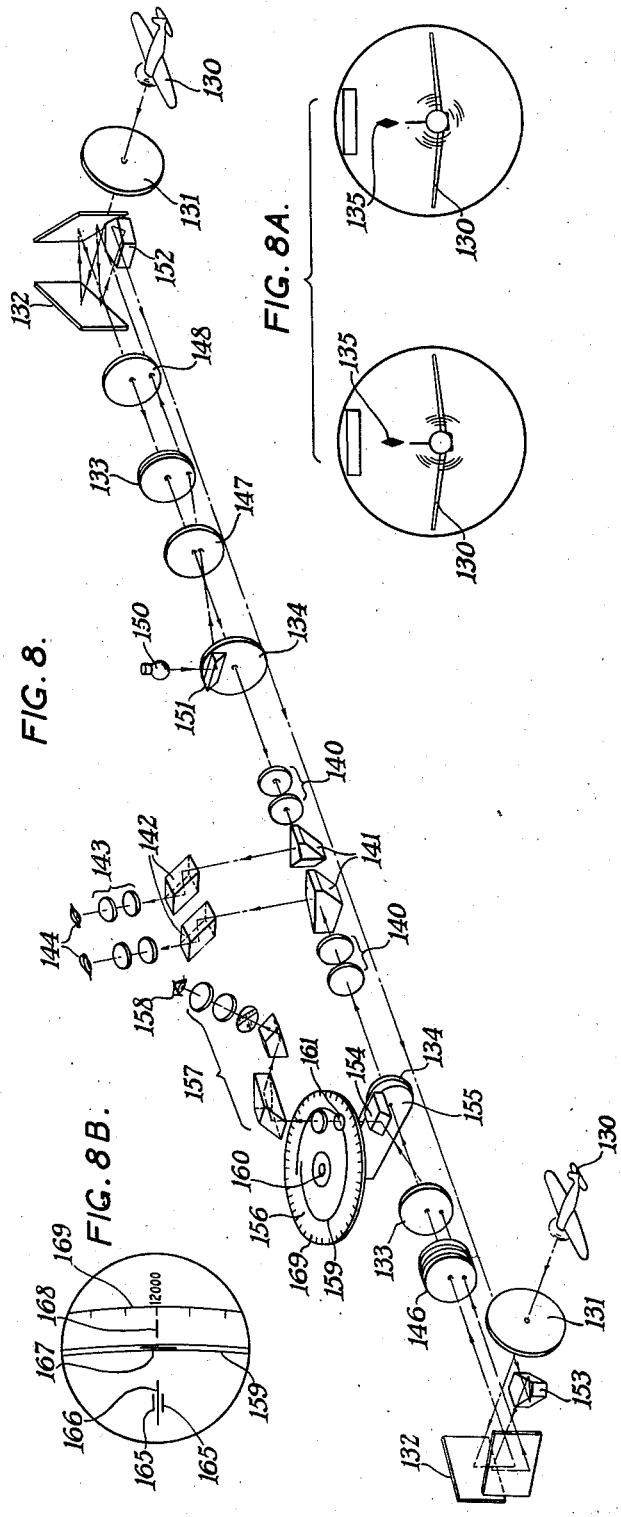
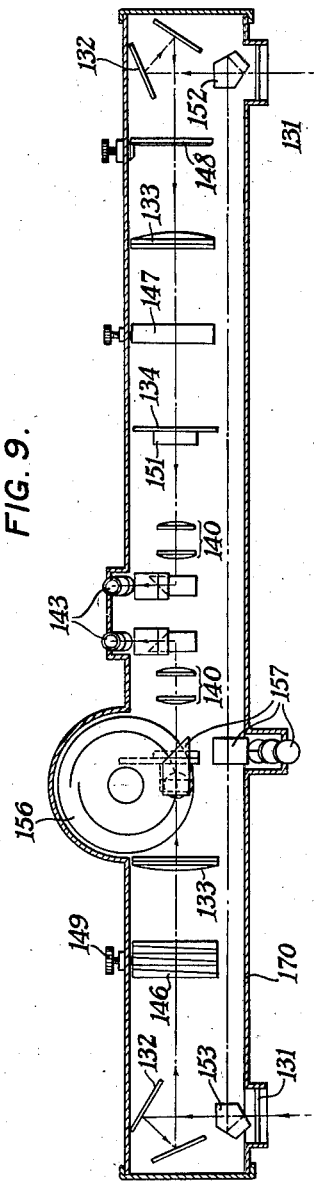
JOSEPH MIHALYI
FORDYCE E. TUTTLE
INVENTORS
BY
ATT'Y & AG'T Patented June 4, 1946

2,401,709

UNITED STATES PATENT OFFICE 2,401,709

RANGE FINDER

Joseph Mihalyi and Fordyce Tuttle, Rochester, N. Y., assignors to Eastman Kodak Company, Rochester, N. Y., a corporation of New Jersey Application January 19, 1943, Serial No. 472,835

22 Claims. (Cl. 88—2.7)

This invention relates to range finders.

This is Case E of a series of applications relating to this same subject. The series includes:

| Title | Serial No. | Filed | Inventors |
|---|---|---|---|
| Mount for optical element. | 461,584 | Oct. 10, 1942 | Mihalyi. |
| Range finder construction. | 461,585 | Oct. 10, 1942 | Do. |
| Range finders—Case A | 472,831 | Jan. 19, 1943 | Do. |
| Range finders—Case B | 472,832 | Jan. 19, 1943 | Do. |
| Range finders—Case C | 472,833 | Jan. 19, 1943 | Do. |
| Range finders—Case D | 472,834 | Jan. 19, 1943 | Mihalyi, MacNeille. |
| Range finders—Case F | 479,096 | Mar. 13, 1943 | Mihalyi. |
| Range finders—Case G | 479,097 | Mar. 13, 1943 | Do. |
| Range finders—Case H | 479,098 | Mar. 13, 1943 | Holmes, Mihalyi. |
| Range finders—Case I | 479,099 | Mar. 13, 1943 | Mihalyi, MacNeille. |
| Range finders—Case J | 479,100 | Mar. 13, 1943 | MacNeille, Holmes. |
| Range finders—Case K | 479,101 | Mar. 13, 1943 | Mihalyi, MacNeille. |
| Range finders—Case L | 479,102 | Mar. 13, 1943 | Mihalyi. |
| Polarizing beam splitter. | 481,391 | Apr. 1, 1943 | MacNeille. |
| Range finders—Case M | 491,954 | June 23, 1943 | Do. |
| Range finders—Case N | 491,955 | June 23, 1943 | MacNeille, Mihalyi. |
| Range finders—Case O | 491,956 | June 23, 1943 | MacNeille. |
| Range finders—Case P | 505,016 | Oct. 5, 1943 | MacNeille, Mihalyi. |

Cases A, B, and C describe auto collimating range finders in which an image of one adjustment coindicant element is projected adjacent to the other, the element light beam passing through the range finder optical system to compensate for any maladjustment therein.

The present Case E has for its object the expansion of the range scale or more exactly, the conversion of the small displacement of the index to a large easily controlled movement of some movable member. This permits the use of either a greatly expanded scale or, what is the equivalent thereof, a direct mechanical coupling to a director such as used in timing fuses in anti-aircraft fire. The object of one embodiment of the present invention is to provide this large movement in a form useable with the prevalent types of directors.

These objects of the invention are obtained by substituting for the scale and index specified in cases A, B, and C of this series, a coincidence line and fiducial mark arranged to operate approximately at right angles to the direction of deviation of the element light beam. The image of one of these is projected through the optical system of a range finder as described in the other cases of the series into focus forming an image adjacent to the other element (or possibly an image of the other element). The coincidence line is carried, or more generally both elements are carried, on a movable member which is moved to bring the line and mark into coincidence as indicated by superposition of the element image and the adjacent other element. If, for example, due to the adjustment of the instrument the fiducial mark is moved slightly in a direction which for convenience we shall refer to as horizontal, the coincidence line which is not quite vertical is then moved in a vertical direction a relatively great distance until it is brought into coincidence with the fiducial mark image.

Of course, in certain forms of the invention, the terms "coincidence line" and "fiducial mark" are interchangeable relative to the elements especially if both elements are carried on the movable member, but at least one element must be so mounted and this one can always be referred to as the coincidence line. The member carrying the coincidence line is movable at only a slight angle to the line so that a large movement produces only a small effective shift of the line. The line may be straight and the movement linear at a slight angle thereto or the line may be spiral, (flat or helical) and the movement circular so that the slight angle in question is between the tangents to the spiral and to the corresponding circle respectively.

In one embodiment of the invention the movable member operates a scale and index by moving one relative to the other, for example, by carrying a scale which is read against a fixed index. Preferably the coincidence line is so curved that the degree of movement of the movable supporting member is linear with respect to the range. Such an arrangement permits direct coupling into standard forms of directors. The exact shape of the coincidence line to give this effect is obtained directly in the same way as any scale is calibrated. For example, the movable member may be moved in equal increments and the correct position of the line marked to correspond to equal increments in range. In this case the curve may be referred to as an equi-crescent spiral and may be computed from the simple formulae relating range and displacement well known to any range finder designer. The formula for computing each point is:

$$\frac{1}{r_{min}} - \frac{1}{r} = \frac{(R_{max} - R_{min})}{BF} \frac{A}{A_{max}}$$

where $r$ is the radius to the point on the spiral, $A$ is the angle to the point on the spiral, $R$ is the range, $B$ is the base length, and $F$ is the objective focal length.

Many range finders have what is called a halving adjuster. These devices which often are simple tilting blocks of glass are used to move the object images differentially in elevation, i. e. in a direction at right angles to the direction in which they are moved for coincidence adjustment. With the present invention the use of a coincidence line requires the halving adjustment to be accurately maintained. Although this may be accomplished by sturdy construction of the range finder, one preferred embodiment has a halving adjuster and also has adjacent to each of the elements, halving indicating marks. The image of one of these marks is projected with the adjacent adjustment coindicant element to form an image which is in elevation coincidence with the other halving indicating mark when the halving adjustment is proper. Thus, while a reading is being taken, there is a direct indication of the halving adjustment and it may be corrected if improper.

Even when other forms of range indicating elements are used, these halving indicating marks are useful since they give easy, exact and simple indication of the halving adjustment.

The details of the invention and further objects and advantages thereof will be understood from the following description when read in connection with the accompanying drawings, in which:

Fig. 3 is a perspective view of the optical system of a preferred embodiment of the invention, Figs. 3A and 3B showing the views through the eyepieces of the instrument;

Fig. 5 is a plan view by range finder incorporating the optical system shown in Fig. 3;

Fig. 6 shows an alternative form of one detail of the system shown in Fig. 3;

Fig. 7 is a perspective view of another embodiment of the invention;

Fig. 8 illustrates the application of the invention to a stereo range finder, Fig. 8A showing the field of view through the binocular eyepieces and Fig. 8B showing the field through the range reading eyepiece;

Fig. 9 is a plan view of a range finder incorporating the optical system shown in Fig. 8;

Fig. 10 illustrates still another embodiment of the invention.

Figures 1, 2, 4:
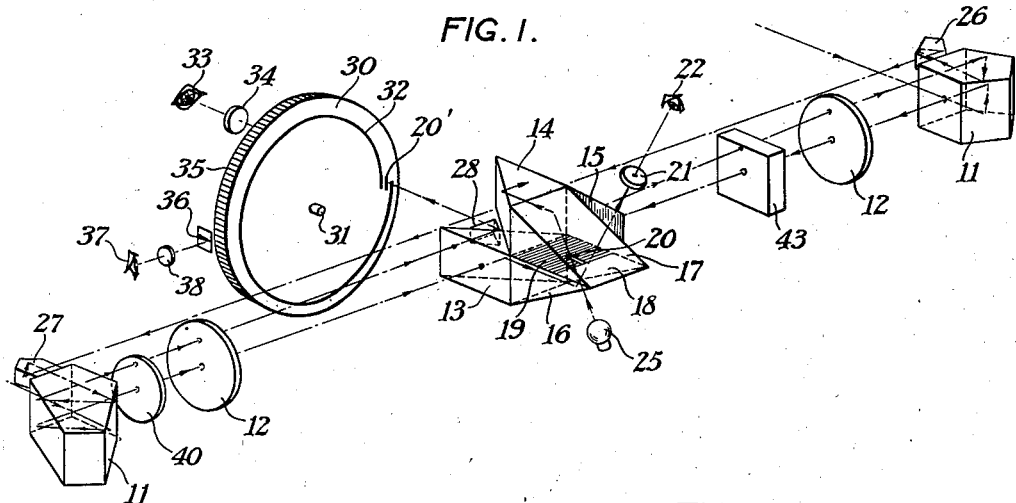
Fig. 1 is a perspective view of the optical system of one embodiment of the invention.
Fig. 2 is a plan view of a range finder incorporating the optical system of Fig. 1.
Fig. 4 shows one detail of the embodiment shown in Fig. 3.

In Figs. 1 and 2 two light beams from the object being ranged are received by pentaprisms 11 and directed through objectives 12 toward crossed prisms 13 and 14 and after reflection are brought into focus in a comparison field. These beams are reflected by the crossed prisms 13 and 14 into two right angle prisms 16 and 17 whose interface has two portions one of which, 18, is transmitting and the other of which, 19, is reflecting. A light deviator 40 is provided to permit coincidence adjustment of the object images and halving adjuster consisting of a tiltable block 43 is provided for elevation adjustment of the object images. These object images are viewed through an eyepiece 21 by the eye 22 of the primary observer. According to the invention, light from a lamp 25 passes through a fiducial mark 20 which consists of a transparent area in the reflector 19 and forms an element beam which passes in turn through the halving adjuster 43, an objective 12 to be collimated thereby, a penta prism 11, a small penta prism 26 cemented thereto and then from one viewing point to the other to be directed back into the range finder system by another small penta prism 27 cemented to the other viewing point penta prism 11 whence it is focused by the objective 12 and enters the prism 13 but instead of being reflected into the right angle prism 16, it enters an auxiliary prism 28 cemented to the hypotenuse surface of the prism 13. This element beam is brought to focus forming an image 20′ of the fiducial mark on a disk 30 which rotates about a pivot 31. The disk 30 carries a spiral 32 which operates as a coincidence line for the fiducial mark image 20′ when observed through the eyepiece 34 by the eye 33 of a coincidence observer. The coincidence observer rotates the disk 30 until the spiral 32 overlaps the image 20′ exactly. At this time, the range is read by a third observer whose eye appears at 37 through an eyepiece 38 focused on an index 36 and a scale 35 carried on the rim of the disk 30.

All of this optical system is shown in Fig. 2 mounted in a housing 41 through which knobs 42 and 44 extend to permit operation respectively of the light deviating means 40 and the halving adjuster 43. These Figs. 1 and 2 are mainly to illustrate the principle of the invention broken into its component parts, but more preferable embodiments require fewer observers or have fiducial marks coupled to the coincidence line.

Fig. 3 differs from Fig. 1 by having the fiducial mark mounted on the same rotating member as the coincidence line. In Fig. 3 the coincidence line is the adjustment coindicant element projected, only part of it being projected at any one time of course. Light from a lamp 50 is reflected by a totally reflecting prism 51 through a transparent spiral 52 carried on a disk 53 mounted to rotate about a pivot 54. This light enters a rhomb 55 and then by means of a small prism 56 cemented to the hypotenuse surface of the prism 14 enters the range finder optical system to begin the round trip coming out again at the prism 28 to enter another rhomb 57 and to come to focus forming an image 52′ adjacent to a circle 60 carried concentrically by the disk 53. The circle 60 constitutes the fiducial mark in this case. For convenience in reading coincidence a small disk is provided adjacent to the circle 60 having masked off portions 61 accurately aligned on the circle 60. As shown in Fig. 3B the image 52′ of the spiral 52 in general appears to one side of the circle 60. Rotation of the disk 53 will bring into the field of view that portion of the spiral 52 whose image 52′ exactly overlaps the circle 60, i. e. is in coincidence therewith. By means of a relay objective 63, an enlarged image of this disk appears at 62 to be viewed through an eyepiece 64 by the eye 65 of an observer. The range is read by index 58 and scale 59.

In Fig. 4 the disk is shown with the spiral 52 so curved that equal angles of rotation of the disk 53 correspond to equal increments of range indicated on the scale 59.

Fig. 5 shows this same instrument in a housing 70. As shown in this figure, the coincidence of the object images may be adjusted by moving the crossed prisms 13 and 14 transversely with respect to the base of the range finder. This transverse movement is provided by mounting the prism unit in a support 72 which is urged by springs 73 against a ranging knob 71. A second knob 75 is provided on the pivot 54 to rotate the disk carrying the coincidence line and fiducial mark.

Fig. 6 illustrates a simplified device which may be substituted for the disk 53 of Fig. 3. In Fig. 6 the light from the lamp 50 after being reflected by the prism 51 passes through a transparent fiducial mark 81 which in this case is a straight line. The coincidence line 82 is also a straight line at a slight angle to the mark 81 so that they tend to converge which is, of course, the equivalent to the circle and spiral system of Fig. 3. The member 80 carrying both the fiducial mark and coincidence line is moved linearly until coincidence is reached at which time the range may be read by a scale 83 against an index 84.

In Fig. 7 the invention is applied to a single objective range finder in which the object beams are reflected respectively by a mirror 90 and a semi-transparent mirror 91 through an objective 92 and an erecting prism 93 into focus on a disk 94. The object images are viewed through an eyepiece 95 by the eye 96 of an observer. Coincidence is provided by rotating the mirror 90 by means of a supporting nut 97 and driving screw 98. Light from a lamp 100 is reflected by a total reflecting prism 101 through a transparent circle 102 mounted on a rotatable disk 103 to constitute a fiducial mark. The element beam from this mark 102 passes through the erecting prism 93, the objective 92 and is reflected first by the front surface 106 of a prism cemented to the mirror 90 and, second, by a dove prism 104 cemented to the semi-transparent mirror 91. This beam is then focused by the objective 92 to form an image 102' on the disk 94 whereat it is matched by a coincidence line in the form of spiral 105 also mounted on the disk 103. In the embodiment shown, the range is read by a scale 110 carried by the disk 103, against an index 111 when the disk 103 is rotated to give coincidence between the spiral 105 and image 102'. Alternatively the scale could be engraved adjacent to the spiral to be read directly through the eye-piece 95 or adjacent to the circle 102 so that the image of the scale would be projected therewith to appear adjacent to the line image 102' and again to be read through the eyepiece 95. Similarly, the equivalent system in which no scale is read but in which the setting of the disk 103 is fed directly by mechanical coupling such as spur gears into a director or timer, may be used.

In Fig. 8 the invention is applied to a stereoscopic range finder in which the object being ranged is represented by two small aeroplanes 130. Light from this object passes through front windows 131 and is reflected by optical squares 132 through objectives 133 forming images in the image planes 134. By means of relay lenses 140, erecting prisms 141, rhombs 142 for adjusting for interpupillary separation and eyepieces 143 these images are viewed stereoscopically by the right and left eyes 144 of an observer. The images 130 as seen in Fig. 8A are viewed stereoscopically to give an apparent object distance which can be varied by adjusting a light deviating means 146 (by a knob 149 shown in Fig. 9) until this apparent object distance appears the same as the apparent reticle mark distance of two reticle marks 135 engraved on the image planes 134. The halving or azimuth adjustment of the images relative to one another is provided by tilting plate 147. Also, the zero of the scale may be corrected by a thin rotatable wedge 148.

Light from a lamp 150 is reflected by a prism 151 past a fiducial mark also engraved on the focal plane 134. This light forms an element beam which is collimated by the objective 133 and reflected by the optical square 132 to a small auxiliary optical square 152 which reflects it from one window vicinity to the other whereat it strikes an auxiliary penta prism 153 and reenters the optical system of the range finder. This element beam is focused by the right viewing point objective 133 (which appears to the left of the Fig. 8) in the optical equivalent of the right eye focal plane 134. For convenience a reflector 154 is cemented to this focal plane to reflect this element beam upwards so that this image appears at 167 adjacent to a coincidence line 159 carried by a disk 156 which is rotatable about a pivot 160. To eliminate any unwanted lateral movement between the disk 156 and the image 167, this pivot 160 is carried by transparent member 155 which is also cemented to the focal plane 134. Thus, any lateral movement of the pivot 160 is accompanied by an equivalent movement of the reticle mark 135. By means of an optical system 157 including a relay lens, erecting prisms and an eyepiece, this image 167 and the coincidence line 159 are viewed by the eye 158 of an auxiliary observer. In practice, the primary observer 144 adjusts the light deviating means 146 until the apparent object and reticle mark distances are the same and the auxiliary observer 158 rotates the disk 156 until the fiducial mark image 167 and coincidence mark 159 are in coincidence. At this time, the auxiliary observer may read a scale 169 engraved adjacent to the coincidence line 159, against an index 168 which may either be engraved on an auxiliary disk 161 forming part of the relay system 157 or may be engraved adjacent to the fiducial mark near the prism 151 to be projected therewith.

In any case, it is preferable to have a halving indicating mark engraved adjacent to the fiducial mark so that its image 166 when projected with the mark image 167 falls between marks 165 engraved on the disk 161 only when the halving adjustment of the instrument is correct. This latter feature eliminates any second order error which would be introduced into the scale reading if the halving adjustment were improper. The disk 161 as seen through the optical system 157 is best shown in Fig. 8B.

Fig. 9 shows all of this optical system mounted in a housing 170.

Fig. 10 shows a somewhat different embodiment of the invention in which the object beams are received by penta prisms 115 and reflected by crossed mirrors 120 through a single objective 121 to form images in the focal plane of an eyepiece 122 through which they are viewed by the eye 123 of an observer. In this illustration the sliding member 80 is shown for convenience and light from the fiducial mark is collimated by an auxiliary objective 125 and is reflected by the backs of the mirrors 120 around the optical system and from one viewing point to the other by auxiliary penta prisms 116 which are provided with semi-transparent surfaces 117 and with auxiliary prisms 118 to permit the object beams to enter the optical squares 115. The image thus formed on the member 80 is viewed through an eyepiece 126 of the eye 127 of an observer, the operation being equivalent to that shown in Fig. 3.

Having thus described various embodiments of our invention, we wish to point out that it is not limited to these structures, but is of the scope of the appended claims.

What we claim and desire to secure by Letters Patent of the United States is:

1. A range finder of the type having adjustment coincidant elements indicative of adjustment in the ranging plane and means for projecting through at least part of the optical system of the finder, light from one element into focus forming an image adjacent to at least an image of the other element, said range finder being characterized by one of said elements being a fiducial mark and the other being a coincidence line approximately effectively at right angles to the ranging plane carried by a movable member which is movable in a direction at a slight angle to said line for bringing said element image and said other element into coincidence.

2. A range finder of the type having two spaced viewing points at which substantially collimated beams of light are received from the object being ranged, an optical system including at least one objective for directing the two collimated beams into focus forming images in comparison planes, one portion of the optical system operating only on one of the beams and another portion operating only on the other beam, and a ranging adjuster, said finder being characterized by a fiducial mark and a coincidence line constituting adjustment coincidant elements, said coincidence line being carried by a movable member which is movable in a direction at a slight angle to said line and means for projecting through at least the exact optical equivalent of both of said portions, light from at least one of the elements into focus forming an image of said one element adjacent to at least an image of the other element, said ranging adjuster also adjusting said one element image.

3. A range finder according to claim 2 in which said movable member moves a scale and index relative to one another.

4. A range finder according to claim 2 in which said coincidence line is curved to make the degree of movement of said movable member linear with respect to the range.

5. A ranger finder according to claim 2 in which said coincidence line is a spiral and said movable member is rotatable about a line approximately through the center of said spiral.

6. The range finder according to claim 2 in which said coincidence line is a flat spiral and said movable member is rotatable about a line approximately through the center of said spiral.

7. A ranger finder according to claim 2 in which the elements are converging lines both carried by said movable member.

8. A range finder according to claim 2 in which the mark and the line are converging lines both carried by the movable member and said member is movable parallel to the mark.

9. A range finder according to claim 2 in which the mark and line are converging lines both carried by the movable member, said mark being a straight line and said movable member being movable parallel to the mark.

10. A range finder according to claim 2 in which the fiducial mark is a circle, the coincidence line is a spiral and the movable member carries both and is rotatable about a line perpendicularly through the center of the circle.

11. A range finder according to claim 2 in which the fiducial mark is a circle, the coincidence line is a flat spiral and the movable member is flat, carries both the mark and the line and is pivoted concentrically with the circle.

12. A range finder according to claim 2 in which the fiducial mark is a circle, the coincidence line is a spiral and the movable member carries both and is rotatable about a line perpendicularly through the center of the circle, said spiral being curved to make the angular rotation of the member linear with respect to range.

13. A coincidence range finder of the type having means for aligning light beams from two spaced viewing points, adjustment coincidant elements indicative of adjustment in the ranging plane and integrally attached to one another and means for projecting through at least the equivalent of all of said aligning means, light from one element into focus forming an image adjacent to the other element, said range finder being characterized by one of said elements being a fiducial mark and the other being a concidence line, both elements being lines approximately effectively at right angles to the ranging plane and on a member movable in the direction of the fiducial mark and said lines being converging.

14. A ranger finder according to claim 13 in which both lines are straight.

15. A range finder according to claim 13 in which the fiducial mark is a circle, the coincidence line is a spiral and the movable member carries both and is rotatable about a line perpendicularly through the center of the circle 16. A range finder according to claim 13 in which the fiducial mark is a circle, the coincidence line is a flat spiral and the movable member is flat, carries both the mark and the line and is pivoted concentrically with the circle.

17. A ranger finder according to claim 13 in which the fiducial mark is a circle, the coincidence line is a spiral and the movable member carries both and is rotatable about a line perpendicularly through the center of the circle, said spiral being curved to make the angular rotation of the member linear with respect to range.

18. A ranger finder according to claim 13 in which said movable member moves a scale and index relative to one another.

19. A ranger finder according to claim 13 in which said coincidence line is curved to make the degree of movement of said movable member linear with respect to the range.

20. A range finder according to claim 2 including a halving adjuster for adjusting the relative position of the object images in elevation and having adjacent to the elements halving indicating marks, the image of one of which being in elevation coincidence with the other only when the halving adjustment is proper.

21. A range finder according to claim 13 including a halving adjuster for adjusting the relative position of the object images in elevation and having adjacent to the elements halving indicating marks, the image of one of which being in elevation coincidence with the other only when the halving adjustment is proper.

22. In a range finder having a halving adjuster and autocollimating means for projecting through at least part of its optical system an image of one adjustment coindicant element adjacent to at least an image of another element, the subcombination which consists of a halving indicating mark adjacent to each of the elements, the image of one of the marks as projected adjacent to at least an image of the other mark by said projecting means being in elevation coincidence with the other mark only when the halving adjustment is proper.

JOSEPH MIHALYI.
FORDYCE TUTTLE.